United States Patent Office 2,994,711
Patented Aug. 1, 1961

2,994,711
TRIORGANOSILOXYMETAL OXIDES
Howard J. Cohen, Cincinnati, Ohio, assignor to National Distillers and Chemical Corporation, New York, N.Y., a corporation of Virginia
No Drawing. Filed Aug. 10, 1959, Ser. No. 832,497
3 Claims. (Cl. 260—429)

This invention relates to a process for preparing certain silicon-containing compounds and, particularly, to a process for preparing triorganosiloxymetal oxides having the general formula $(R_1R_2R_3SiO)_xM'_yO_z$, wherein $R_1$, $R_2$, and $R_3$ represent alkyl, aryl, alkylaryl, or heterocyclic radicals and M′ represents a metal of group Vb or group VIb of the periodic system. More particularly, this invention relates to a process for preparing tris-triorganosiloxyvanadium oxides.

A heretofore known method for preparing triorganosiloxymetal oxides involves the reaction of a triorganosilanol or a halide-substituted organosilane with an oxygen-containing acid, ester, or inorganic salt of a metal of group Vb or VIb of the periodic system. The yields of the desired products obtained therefrom are low, especially the yields of triorganosiloxyvanadium oxide, which generally amount to only about 30 to 40 percent of theoretical. In addition the preparation of such compounds, as, for example, the vanadium-containing compound, requires long reflux periods and relatively high temperatures.

It is an object of the present invention to provide a novel and effective method for the preparation of triorganosiloxymetal oxides. It is a further object of this invention to prepare triorganosiloxymetal oxides by a process which overcomes the disadvantages of the prior art processes. Another object of this invention is to produce high yields of tris-triorganosiloxyvanadium oxides by a simple process. Further objects of this invention will become apparent from the following description:

In accordance with this invention, an alkali metal triorganosilanolate is reacted with an oxyhalide of a metal from group Vb or group VIb of the periodic system. The reaction may be illustrated by the following equation:

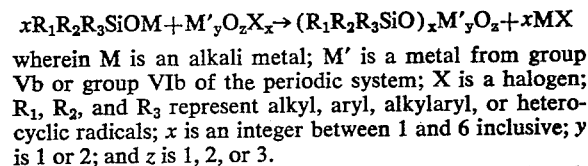

wherein M is an alkali metal; M′ is a metal from group Vb or group VIb of the periodic system; X is a halogen; $R_1$, $R_2$, and $R_3$ represent alkyl, aryl, alkylaryl, or heterocyclic radicals; x is an integer between 1 and 6 inclusive; y is 1 or 2; and z is 1, 2, or 3.

M, the alkali metal, may be any alkali metal, although sodium, potassium, or lithium is preferred. M′ may be any group Vb or group VIb metal, that is, vanadium, niobium, tantalum, chromium, molybdenum, or tungsten. X, a halogen, may be chlorine, bromine, or iodine, although chlorine is most frequently used. The organic radical ($R_1$, $R_2$, and $R_3$) may be alkyl, such as an alkyl group containing from one to eight carbon atoms, and, specifically, methyl, ethyl, propyl, octyl, 2-ethyl hexyl, or the like; aryl, such as an aryl group or grouping containing from six to fourteen carbon atoms, and, specifically, phenyl, naphthyl, or the like; alkylaryl, such as p-tolyl or 4-methylnaphthyl; or heterocyclic. $R_1$, $R_2$, and $R_3$ may all be the same or they may be different members within the above-listed group.

Generally speaking, approximately stoichiometric amounts of the starting materials are used for the reaction of the present invention. It is, however, usually preferred to maintain the alkali metal salt in excess (up to about 16 percent, based on the alkali metal triorganosilanolate) throughout the addition of the oxyhalide. Such an excess is desirably used since the use of more than stoichiometric amounts of the oxyhalide may lead to the formation of triorganosiloxymetal oxyhalides; for example, use of excess vanadium oxychloride may result in undesired formation of $(R_3SiO)_2VOCl$ and $(R_3SiO)VOCl_2$.

The reaction of the oxyhalide with the alkali metal triorganosilanolate is preferably, but not necessarily, carried out in an inert liquid medium which is a complete or partial solvent for one or both of the reactants. The solvent employed is preferably organic and anhydrous and may be an aromatic hydrocarbon, such as benzene, toluene, xylene, and the like, or mixtures thereof; a hydrocarbon mineral spirits fraction; and so forth.

The reaction proceeds smoothly at any temperature between about the melting point of the solvent, when employed, and the boiling point of said solvent or of the product obtained. At temperatures substantially above room temperature, however, siloxymetal oxides decompose, and so the preferred temperature range for the reaction is between about 0° and 30° C.

When the process of the present invention results in a liquid product, as in the case of tris(trimethylsiloxy)-vanadium oxide, the product may be separated from the metal halide by-product by simple filtration followed by drying by any standard procedure. When a solid product is obtained, as in the case of tris(triphenylsiloxy)-vanadium oxide, it may be isolated and purified by such standard techniques as recrystallization, sublimation, or leaching.

The more detailed practice of the present invention is illustrated by the following example wherein parts are given by weight unless otherwise specified. This example is illustrative only and is not intended to limit the invention in any way except as indicated by the appended claims.

Example 24.3 parts of sodium trimethylsilanolate were mixed with 12.1 parts of vanadium oxychloride in 259.3 parts of benzene while the reaction temperature was maintained at 5–10° C. The reaction mixture was filtered, and the benzene was flashed off under reduced pressure. The resulting tris(trimethylsiloxy)vanadium oxide was purified by vacuum distillation. The yield was about 91 percent of theoretical. The product, $[(CH_3)_3SiO]_3VO$, had the following properties: boiling point, 65–66° C./0.35 mm.; $n^D{}_{25.9}$, 1.45153. Elemental analysis of the product gave: 15.21% V found (15.25% calculated), 24.81 Si found (25.20% calculated), 33.61% C found (32.41% calculated), 8.21% H found (8.14% calculated), and 18.16% O found (19.0% calculated).

The triorganosiloxymetal oxides prepared by the process of the present invention may be used as catalysts in processes such as petroleum cracking. They may also find application in corrosion inhibiting compositions, as ultraviolet light screens, as additives for improving burning characteristics of propellants or fuel oils, and as driers for paints and varnishes.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for making triorganosiloxymetal oxides having the general formula $(R_1R_2R_3SiO)_xM'_yO_z$ which comprises reacting an alkali metal triorganosilanolate having the general formula $R_1R_2R_3SiOM$ with a metal oxyhalide having the general formula $M'_yO_zX_x$, wherein each of $R_1$, $R_2$, and $R_3$ is a member selected from the group consisting of the phenyl radical and alkyl radicals containing from one to eight carbon atoms; M is an alkali metal; M' is a metal from group Vb of the periodic system; X is a halogen; $x$ is a number between 1 and 6, inclusive; $y$ is a number between 1 and 2, inclusive; and $z$ is a number between 1 and 3, inclusive, said reaction being carried out at a temperature below the decomposition temperature of the product triorganosiloxymetal oxide.

2. The process of claim 1 wherein the alkali metal is selected from the group consisting of sodium, potassium, and lithium.

3. A process for making tris(trimethylsiloxy)vanadium oxide which comprises reacting sodium trimethylsilanolate with vanadium oxychloride at a temperature between about 0° and 30° C.

References Cited in the file of this patent

UNITED STATES PATENTS

| | | |
|---|---|---|
| 2,567,110 | Hyde | Sept. 4, 1951 |
| 2,863,891 | Granchelli et al. | Dec. 9, 1958 |